Sept. 11, 1962　　　W. E. McBRIDE　　　3,052,971
TOOL FOR MOUNTING PLASTIC HANDLES ON BOTTLES
Filed Sept. 9, 1959
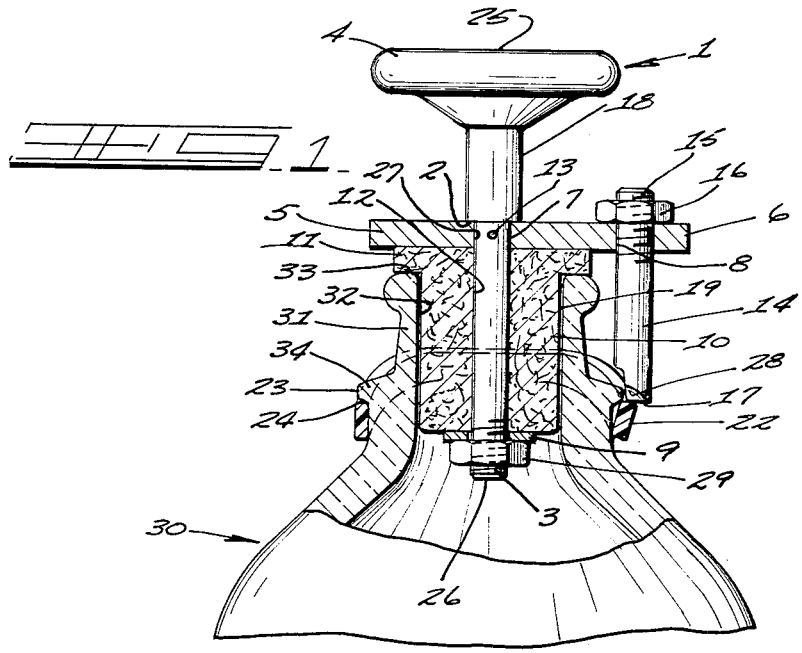
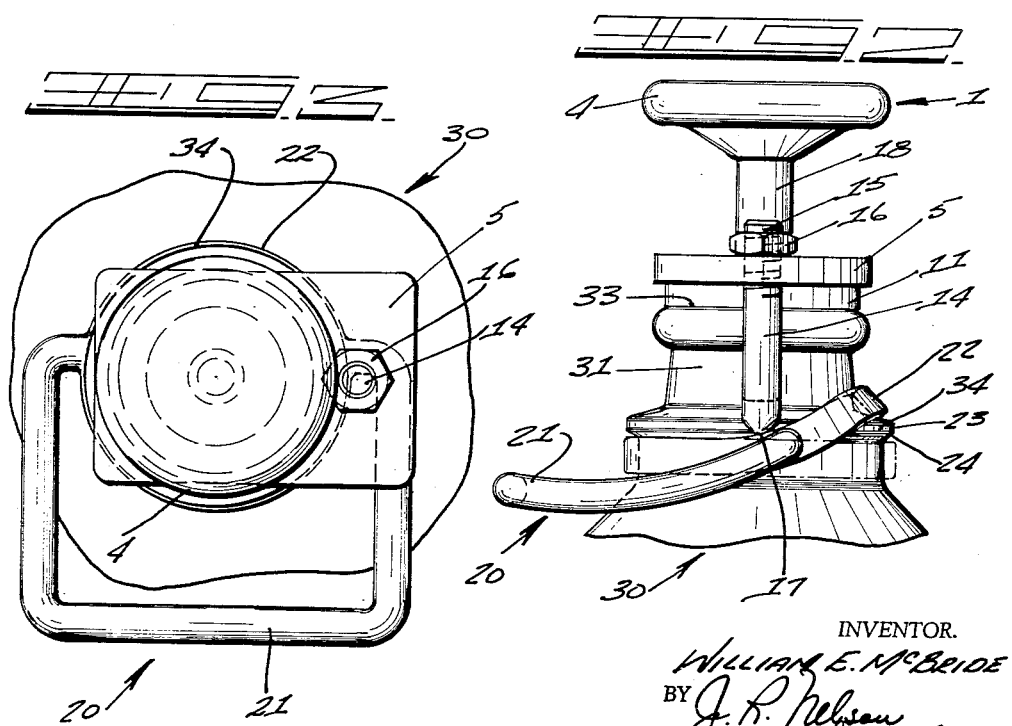
INVENTOR.
WILLIAM E. McBRIDE
BY J. R. Nelson
 + W. A. Schaich
ATTORNEYS.

United States Patent Office 3,052,971
Patented Sept. 11, 1962

3,052,971
TOOL FOR MOUNTING PLASTIC HANDLES
ON BOTTLES
William E. McBride, Streator, Ill., assignor to Owens-Illinois Glass Company, a corporation of Ohio
Filed Sept. 9, 1959, Ser. No. 838,924
3 Claims. (Cl. 29—235)

This invention relates to a tool for mounting a handle or other attachments having a stretchable collar portion on the neck of a container, such as a bottle. It has been found desirable to provide plastic handles for the larger size glass bottles, particularly the gallon size glass milk bottle. The handles provided are made of a tough plastic material and are only slightly stretchable. Formerly, the job of mounting these handles was done entirely by hand. The collar portion of the handle was placed over the neck of a bottle and pressed down by hand thereby being stretched to ride over a ridge or radial shoulder formed on the neck of the bottle and then contracting to underlie the ridge. Since a durable handle has to be made with a fairly large cross-sectional configuration, stretching the collar portion was a difficult job. Manual assembly was not only time consuming and required a great deal of physical effort, but it also caused much wear and tear on the assembler's fingers.

Accordingly, it is an object of this invention to provide a tool for mounting attachments having a flexible annular portion on containers.

Another object of this invention is to provide an economical tool for mounting plastic handles on containers with comparative ease.

A further object of this invention is to provide a mounting tool of simple construction, which may be easily transported and handled.

The specific nature of this invention, as well as other objects and advantages thereof, will become apparent to those skilled in the art from the following detailed description taken in conjunction with the annexed sheet of drawings on which, by way of example only, the preferred embodiments of this invention are illustrated.

Referring to the accompanying drawings:

FIG. 1 is a front elevational view of the tool, handle, and container with parts thereof in section.

FIG. 2 is a side elevational view of FIG. 1.

FIG. 3 is a plan view of the tool, handle, and container in assembled position.

The tool consists of a central body member having a positioning portion at one axial end insertable in the neck of a container and manual gripping means at the other axial end. Spaced intermediate said ends is a rigid radial flange. At the outward end of the flange is rigidly fixed a depending assembly finger which engages the collar portion of the handle.

The collar portion of the handle is placed over the neck of the container and allowed to rest on the annular ridge or radial shoulder which is integrally formed on the neck of the container. The positioning portion of the mounting tool is then inserted into the neck opening of the container and supports and centers the tool within the neck opening. The depending assembly finger, which extends downwardly adjacent to the side of the annular ridge and terminates substantially flush with the underside of the ridge, initially contacts a portion of the collar. That portion of the collar is thus pressed down to underlie the ridge. On rotation of the central body member, the assembly finger will rotate around the ridge and press the remaining portions of the collar into assembled relationship below the ridge.

The container attachment, here illustrated as a handle 20, consists of a gripping portion 21 and an annular or collar portion 22. The handle 20 is generally constructed of some plastic material which is slightly stretchable. However, only the collar portion 22 is required to be constructed of a stretchable material.

The container 30, here illustrated as a glass bottle, consists of a neck portion 31, a neck opening 32, and a circumferentially extending radial shoulder or annular ridge 34 formed on the said neck portion 31. The collar portion 22 of the handle 20 has to be stretched to snap over the ridge 34 to effect its assembly to the bottle 30. The neck opening 32 and the ridge 34 are concentric with respect to each other.

Referring to FIG. 1, the mounting tool 1 consists of a central body member or a central shaft 18 having a manually engageable knob 4 formed on its upper axial end 25. The lower axial end 26 terminates in a threaded portion 3. Between said ends is formed a shoulder 2. A radial support or flange 5 having a hole 27 is assembled on the central shaft 18 to abut against the shoulder 2 and is keyed thereto by means of a radial pin 13. Positioning means, consisting of a cylindrical core 10 having a shoulder 11 and a central longitudinal hole 12, is assembled on the shaft 18 to underlie the radial flange 5. The core 10 may be made from any fairly rigid, non-abrasive material. Preferably, some material like nylon, hard rubber, or a hard fiber is used to avoid scratching and chipping the container 30. A nut 29 and washer 9 are assembled on the threaded portion 3 of the shaft 18 to maintain the core 10 in assembled position.

Located near the outer end 6 of the radial flange 5 is a threaded hole 8. An assembly finger 14 is screwed into the said hole 8 so as to extend downwardly therefrom and is locked in position by means of a nut 16 Assembly finger 14 is a rigid rod-shaped member having its longitudinal axis essentially parallel to the longitudinal axis of the central shaft 18. The lower end 17 of the assembly finger 14 has a rounded or contured surface 28 and is of such length as to project to a substantially flush relationship with the under surface 24 of the container's 30 annular ridge 34 when the tool is mounted thereon.

To assemble the handle 20 on the neck portion 31 of the container 30, the collar portion 22 of the handle 20 is placed on the neck portion 31 and allowed to rest on the annular ridge 34 formed thereon. The positioning means or core portion 10 of the mounting tool 1 is then inserted into the neck opening 32 of the container 30. The outside diameter 19 of the core 10 is sized to fit rotatably within the neck opening 32. The shoulder portion 11 formed on the core 10 rests on the upper end 33 of the neck portion 31. The lower end 17 of the assembly finger 14, extending downwardly adjacent to the side 23 of the annular ridge 34 and substantially flush with the under surface 24 of the ridge 34, contacts a part of said collar portion 22 and presses the part contacted down to underlie the ridge 34. The knob portion 4 is then gripped and the mounting tool 1 is rotated, thereby causing the assembly finger 14 to rotate around the ridge 34. As the assembly finger 14 rotates, the lower end 17 thereof sequentially contacts the remainder of the collar portion 22 and presses the same down over the ridge 34 in a manner illustrated in FIG. 2. The rounded surface 28 of the assembly finger 14 allows smooth and gradual displacement of the collar portion 22. One complete rotation will displace the collar portion 22 of the handle 20 into assembled position as illustrated in FIG. 3.

It is to be understood that the dimensions of the tool may be varied depending on the size of the container and the handle to be assembled. Different sizes of positioning cores, flanges, and assembly fingers may be selectively assembled on the central shaft to conform to the dimensions of any container. Other modifications may be

I claim:

1. A tool for manually mounting a flexible annular attachment beneath a radial shoulder on the neck portion of a bottle, comprising a central body member having at one axial end manual gripping means for axially rotating said central body member, positioning means at its other axial end adapted for insertion within said neck portion for axially centering said central body member relative to the neck portion of said bottle, a support rigidly fixed to a medial portion of said central body member and extending radially outwardly from said central body member beyond said bottle neck portion, and an assembly finger secured to the extremity of said support in depending relation and extending closely adjacent to said radial shoulder, the lower inner surface of said finger being contoured to closely parallel the side wall of said radial shoulder, said assembly finger having at its lower end an arcuate surface adapted to peripherally engage the upper surface of said attachment and progressively depress said attachment over said radial shoulder upon rotation of said tool relative to the bottle, said lower end being at least as wide as said upper surface.

2. A tool for manually mounting a flexible annular attachment beneath a radial shoulder on the neck portion of a bottle, comprising a central body member having at one axial end manually engageable gripping means for axially rotating said central body member, a support member assembled in non-rotatable relationship on a medial portion of said central body member, said support member extending radially outward from said central body member beyond said neck portion, positioning means comprising an annular core removably assembled on said central body member to underlie said support member, said annular core being adapted for snug insertion within said neck portion for axially centering said central body member relative to the neck portion of said bottle, and an assembly finger detachably secured to the extremity of said support member in depending relation and extending closely adjacent to said radial shoulder, the lower inner surface of said finger being contoured to closely parallel the side wall of said radial shoulder, said assembly finger having at its lower end a rounded surface adapted to slidably engage the upper peripheral surface of said attachment and progressively depress said attachment over said radial shoulder upon rotation of said tool relative to the bottle, said lower end being at least as wide as said upper surface.

3. The tool defined in claim 2 wherein said annular core is constructed of a non-scratching material.

References Cited in the file of this patent
UNITED STATES PATENTS

| | | |
|---|---|---|
| 1,416,094 | Krauska | May 16, 1922 |
| 1,968,640 | Elms | July 31, 1934 |